(12) United States Patent
Pitard et al.

(10) Patent No.: US 8,190,308 B2
(45) Date of Patent: May 29, 2012

(54) METHOD AND DEVICE FOR DETECTING A RISK OF COLLISION OF AN AIRCRAFT WITH THE SURROUNDING TERRAIN

(75) Inventors: Fabien Pitard, Toulouse (FR); Jean-Pierre Demortier, Maurens (FR); Florence Aubry, Azelot (FR)

(73) Assignee: Airbus Operations SAS, Toulouse (FR)

( * ) Notice: Subject to any disclaimer, the term of this patent is extended or adjusted under 35 U.S.C. 154(b) by 829 days.

(21) Appl. No.: 11/996,311

(22) PCT Filed: Jul. 25, 2006

(86) PCT No.: PCT/FR2006/001811
§ 371 (c)(1),
(2), (4) Date: Jan. 21, 2008

(87) PCT Pub. No.: WO2007/012749
PCT Pub. Date: Feb. 1, 2007

(65) Prior Publication Data
US 2008/0215197 A1    Sep. 4, 2008

(30) Foreign Application Priority Data

Jul. 26, 2005   (FR) ...................................... 05 07922

(51) Int. Cl.
*G08G 99/00*   (2006.01)
(52) U.S. Cl. ............ 701/9; 340/945; 340/963; 340/970; 342/29; 342/63; 244/75.1; 244/175; 244/181; 244/220; 701/2; 701/8; 701/10; 701/14; 701/400; 701/411; 701/514; 701/528; 701/300; 701/301; 701/302

(58) Field of Classification Search ........................ None
See application file for complete search history.

(56) References Cited

U.S. PATENT DOCUMENTS

| | | | |
|---|---|---|---|
| 3,396,391 A | | 8/1968 | Anderson |
| 5,892,462 A | * | 4/1999 | Tran ................................ 340/961 |
| 5,995,903 A | * | 11/1999 | Smith et al. .................... 701/470 |
| 6,021,374 A | * | 2/2000 | Wood ............................ 701/301 |
| 6,088,654 A | * | 7/2000 | Lepere et al. ................. 701/301 |

(Continued)

FOREIGN PATENT DOCUMENTS

FR   2 740 570   5/2004

OTHER PUBLICATIONS

International Search Report dated Dec. 28, 2006.

(Continued)

*Primary Examiner* — Jonathan M Dager
(74) *Attorney, Agent, or Firm* — Dickinson Wright PLLC

(57) ABSTRACT

A method and device for detecting a risk of collision of an aircraft, having a profile unit having knowledge of the terrain profile, a determination unit for determining effective values of particular flight parameters, a checking unit for verifying whether a flight path determined by the effective values is compatible with the terrain profile, and a transmitting unit for emitting a warning signal in case of incompatibility. The checking unit includes at least one element for calculating a height variation due to an energy transfer and a total slope variation generated by a speed reduction, during an evasive action, an element deter mining an evasive course using the height variation, and an element verifying whether the evasive course determined is compatible with the terrain profile.

12 Claims, 3 Drawing Sheets

U.S. PATENT DOCUMENTS

| | | | |
|---|---|---|---|
| 6,445,310 B1 * | 9/2002 | Bateman et al. | 340/970 |
| 6,480,120 B1 * | 11/2002 | Meunier | 340/970 |
| 6,538,581 B2 * | 3/2003 | Cowie | 340/961 |
| 6,691,004 B2 * | 2/2004 | Johnson et al. | 701/14 |
| 6,940,994 B2 * | 9/2005 | Nixon et al. | 382/100 |
| 7,006,904 B2 * | 2/2006 | Pippenger | 701/3 |
| 7,403,132 B2 * | 7/2008 | Khatwa | 340/970 |
| 7,917,289 B2 * | 3/2011 | Feyereisen et al. | 701/448 |
| 8,068,038 B2 * | 11/2011 | Engels et al. | 340/970 |
| 2001/0013836 A1 * | 8/2001 | Cowie | 340/961 |
| 2002/0069019 A1 * | 6/2002 | Lin | 701/301 |
| 2002/0080059 A1 * | 6/2002 | Tran | 342/29 |
| 2002/0080145 A1 * | 6/2002 | Ishihara | 345/589 |
| 2002/0153485 A1 * | 10/2002 | Nixon et al. | 250/330 |
| 2003/0107499 A1 * | 6/2003 | Lepere et al. | 340/945 |
| 2003/0122701 A1 * | 7/2003 | Tran | 342/29 |
| 2003/0132860 A1 * | 7/2003 | Feyereisen et al. | 340/973 |
| 2004/0181318 A1 * | 9/2004 | Redmond et al. | 701/9 |
| 2004/0215372 A1 * | 10/2004 | Bateman et al. | 701/1 |
| 2004/0239529 A1 * | 12/2004 | Tran | 340/961 |
| 2005/0261811 A1 * | 11/2005 | Artini et al. | 701/3 |
| 2005/0269448 A1 * | 12/2005 | Chardon | 244/76 R |
| 2005/0273221 A1 * | 12/2005 | Artini et al. | 701/3 |
| 2006/0004497 A1 * | 1/2006 | Bull | 701/10 |
| 2006/0052912 A1 * | 3/2006 | Meunier | 701/10 |
| 2006/0097895 A1 * | 5/2006 | Reynolds et al. | 340/961 |
| 2006/0273929 A1 * | 12/2006 | Tran | 340/961 |
| 2006/0290532 A1 * | 12/2006 | Persson et al. | 340/975 |
| 2007/0182589 A1 * | 8/2007 | Tran | 340/961 |
| 2007/0265776 A1 * | 11/2007 | Meunier et al. | 701/301 |
| 2010/0125381 A1 * | 5/2010 | Botargues et al. | 701/9 |

OTHER PUBLICATIONS

Written Opinion of the ISA dated Dec. 28, 2006 w/ English translation.

* cited by examiner

METHOD AND DEVICE FOR DETECTING A RISK OF COLLISION OF AN AIRCRAFT WITH THE SURROUNDING TERRAIN

TECHNICAL FIELD OF THE INVENTION

The present invention relates to a method and a device for detecting a risk of collision of an aircraft, in particular a transport aircraft, with the surrounding terrain.

BACKGROUND OF THE INVENTION

It is known that the purpose of such a device, for example of the TANS ("Terrain Avoidance and Warning System") type or of the GPWS ("Ground Proximity Warning System") type is to detect any risk of collision of the aircraft with the surrounding terrain and to warn the crew when such a risk is detected, such that the latter can then implement a terrain avoidance maneuver. Such a device generally comprises:

- a first means knowing a profile of the terrain located in front of the aircraft;
- a second means for determining the effective values of particular flight parameters;
- a third means for calculating, from said effective values, an avoidance path that is the best possible representation of the real situation, and for checking if this avoidance path is compatible with said profile of the terrain, at least over a predetermined distance in front of the aircraft; and
- a fourth means for transmitting a corresponding warning signal, if said third means detects an incompatibility.

In general, said third means uses a model, intended to represent an avoidance maneuver carried out by an aircraft, for calculating the corresponding path. However, the model used which generally takes account of a constant load factor and a fixed path representative of a stabilized state of the aircraft, reproduces fairly well the maneuver implemented by the aircraft. Furthermore, the approximations made make it necessary to take account of large error margins, in order not to overestimate the real performance of the aircraft during an avoidance maneuver. However, the taking into account of the error margins can in particular result in false alarms. The calculation mode and the checking mode used by said third means are not therefore completely reliable.

SUMMARY OF THE INVENTION

The present invention relates to a method for detecting a risk of collision of an aircraft with the surrounding terrain which makes it possible to overcome these disadvantages.

For this purpose, according to the invention, said method, according to which the following series of successive steps is carried out automatically and repetitively:

a) a profile of the terrain located in front of the aircraft is taken into account;
b) the effective values of particular flight parameters are determined;
c) from these effective values, an avoidance path comprising at least a pull-out part and a constant slope part is determined and it is projected in front of the aircraft;
d) it is checked if said avoidance path is compatible with said profile of the terrain, at least over a predetermined distance in front of the aircraft; and
e) if an incompatibility is detected in step d), a corresponding warning signal is transmitted, is noteworthy in that:

in step c):
  there is calculated, using determined effective values of certain of said particular flight parameters, a height variation of the aircraft which is due to a transfer of energy and a total slope variation generated by a speed reduction during an avoidance maneuver; and
  a the height variation thus calculated is used for determining an avoidance path which is the best possible representation of reality and which comprises, between the pull-out part and the part at constant slope, an intermediate part which takes account of this height variation; and
in step d), the avoidance path thus determined is used to check if that avoidance path is compatible with said profile of the terrain over said predetermined distance in front of the aircraft.

Thus, because of the invention, there is taken into account a height variation of the aircraft which is due to a transfer of energy and to a thrust variation during the avoidance maneuver, which makes it possible to optimize the model used in step c) and described below. The processings used during this step c) are therefore adapted to be as close as possible to reality. Consequently, the detection of a risk of collision with the terrain takes account of an avoidance maneuver which is very close to the avoidance maneuver actually used if necessary by the aircraft, which, in particular, makes it possible to avoid false alarms and to obtain particularly reliable monitoring.

In a first embodiment, said total slope variation generated by a speed reduction corresponds to a thrust variation.

Advantageously, in this first embodiment:
in step b):
  a the effective mass GW of the aircraft is estimated;
  the current effective speed VO of the aircraft is measured; and
  the current effective slope $\gamma O$ of the aircraft is measured; and
in step c), there is calculated said height variation $\Delta H$, using the following equations:

$$\Delta H = [K1 \cdot (VO^2 - VF^2)/2 \cdot g + (K2 \cdot (VO - VF) + K3)/(GW - GWO)] \cdot f(x)$$

$$f(x) = f(X - XO; VF; GW; \gamma F - \gamma O)$$

$$f(x) \in [O; 1]$$

in which:
K1, K2 and K3 are predetermined parameters depending on the aircraft;
g represents the acceleration of gravity
GWO represents a predetermined constant value of the mass of the aircraft, dependent on said aircraft;
VF represents a constant value of the speed corresponding to the stabilized speed reached at the end of the avoidance maneuver, this value being predetermined and dependent on the aircraft;
$\gamma F$ represents a constant value of the flight slope corresponding to the flight slope with respect to the ground, stabilized at the end of the avoidance maneuver, this value being predetermined and dependent on the aircraft and on status parameters;
X represents the current position of the aircraft on a horizontal axis of a vertical plane of symmetry of the aircraft; and
XO represents the position of the aircraft, on said horizontal axis of said vertical plane, at the start of a height variation phase of said avoidance maneuver.

Moreover, in a second embodiment, in step c), said height variation is calculated, step by step, by producing the sum:
of a first height variation which represents the conversion of kinetic energy into potential energy provoked by the deceleration; and
and of a second height variation which represents the total slope of the step in question.

Moreover, advantageously, in order to optimize an initial pull-out phase of the avoidance maneuver:
in step c):
there is calculated, using determined effective values of certain of said particular flight parameters, a load factor which is representative of a pull-out phase of the avoidance maneuver; and
the load factor thus calculated is used to determine a pull-out part of the avoidance path, which is the best possible representation of reality; and
in step d), the pull-out part thus determined is used to check if the avoidance path is compatible with said profile of the terrain, over said predetermined distance in front of the aircraft.

In this case, preferably,
in step b):
the effective mass GW of the aircraft is estimated; and
the current effective speed VO of the aircraft is measured; and
in step c), said load factor Nz is calculated using the following expression:

$$Nz=n0+(n1 \cdot GW)+(n2 \cdot VO)$$

in which n0, n1 and n2 are predetermined parameters.

In a particular embodiment, at least certain of said predetermined parameters and if necessary said constant values depend on the effective flight configuration of the aircraft. This makes it possible to improve the representativeness of the modeled avoidance maneuver, in comparison with the maneuver likely to be actually carried out by the aircraft.

The present invention also relates to a device for automatically detecting a risk of collision of an aircraft with the surrounding terrain, said device comprising:
a first means knowing a profile of the terrain located in front of the aircraft;
a second means for determining the effective values of particular flight parameters;
a third means for calculating, from said effective values, an avoidance path, and for checking if said avoidance path is compatible with said profile of the terrain, at least over a predetermined distance in front of the aircraft; and
a fourth means for transmitting a corresponding warning signal, if said third means detects an incompatibility.

According to the invention, said device is noteworthy in that said third means comprises at least:
a first unit for calculating, using determined effective values of some of said particular flight parameters, a height variation of the aircraft which is due to a transfer of energy and to a variation in thrust generated by a speed reduction, during an avoidance maneuver;
a second unit for using the height variation calculated by said first unit, in order to determine an avoidance path that is the best possible representation of reality; and
a third unit for using the avoidance path determined by said second unit in order to check if this avoidance path is compatible with said profile of the terrain, over said predetermined distance in front of the aircraft.

In a particular embodiment, said third means furthermore comprises:
a fourth unit for calculating, using determined effective values of certain of said particular flight parameters, a load factor which is representative of a pull-out phase of the avoidance maneuver;
a fifth unit (corresponding for example to said second unit) for using the load factor, calculated by said fourth unit, in order to determine a pull-out part of the avoidance path, which is the best possible representation of reality; and
a sixth unit (corresponding for example to said third unit) for using this pull-out part determined by said fifth unit, in order to check if said avoidance path is compatible with said profile of the terrain, over said predetermined distance in front of the aircraft.

BRIEF DESCRIPTION OF THE DRAWINGS

The figures of the appended drawing will give a good understanding of how the invention may be embodied. In these figures, identical references indicate similar units.

DETAILED DESCRIPTION OF THE INVENTION

Figure 1:
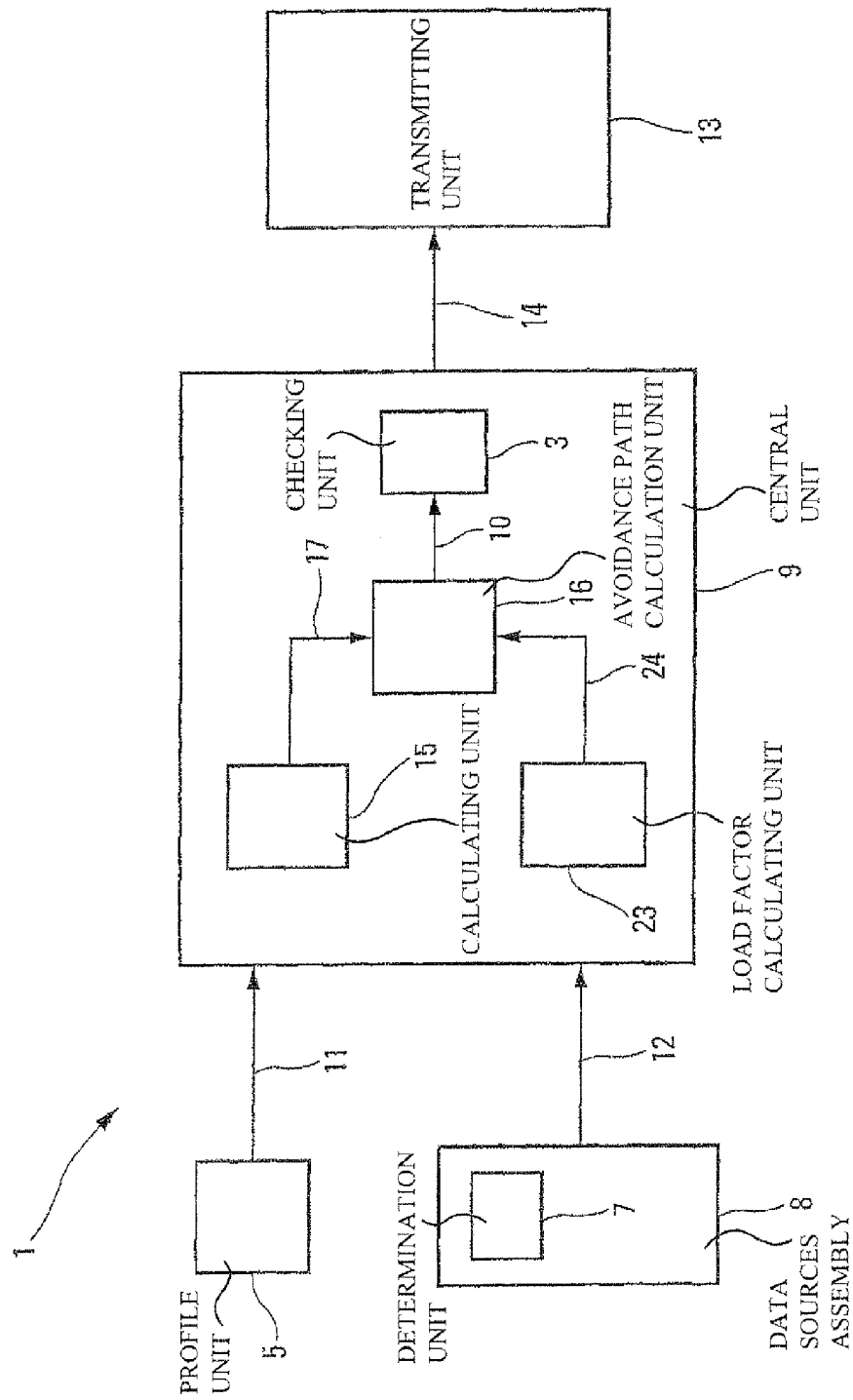
FIG. 1 is the block diagram of a device according to the invention.
Figure 2:
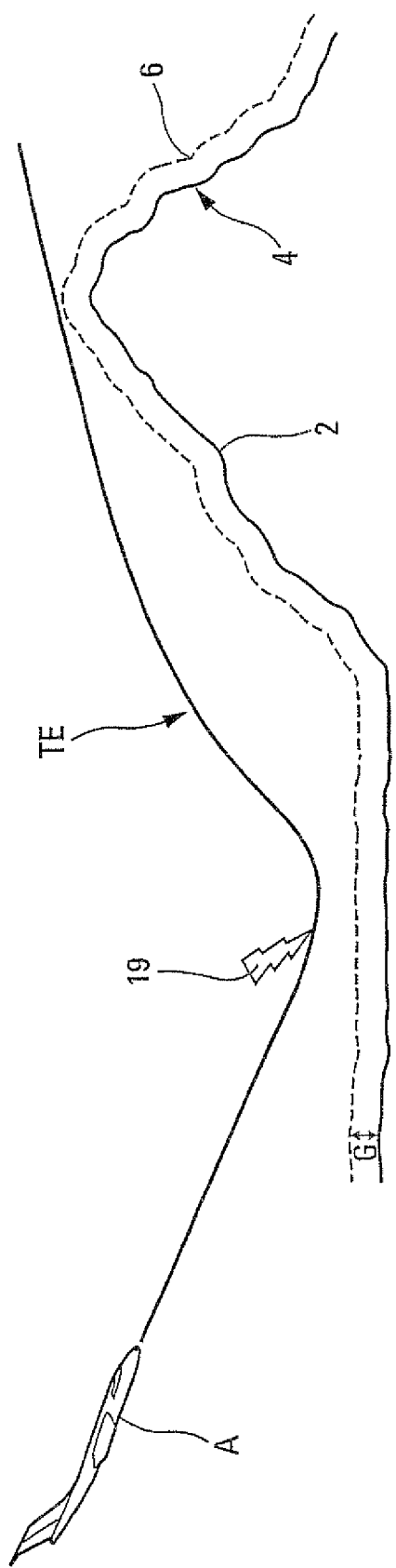
FIG. 2 is a diagrammatic illustration of a pull-out maneuver taken into account in the present invention.

The purpose of the device 1 according to the invention and shown diagrammatically in FIG. 1 is to automatically detect any risk of collision of an aircraft A, in particular a military transport aircraft, with the surrounding terrain 2 and to warn the crew of the aircraft A when such a risk is detected, such that the latter can then implement a maneuver TE for avoidance of the terrain 2, as shown in FIG. 2.

Such a device 1, for example of the TAWS ("Terrain Avoidance and Warning System") type or of the GPWS ("Ground Proximity Warning System") type, which is installed in the aircraft A, comprises in the usual manner:
a means 5 which knows the profile of the terrain 6 at least in front of the aircraft A and which comprises for this purpose for example a database containing said terrain profile 6 and/or a means of detection of the terrain such as a radar. Said terrain profile 6 is for example at a predetermined clearance height G above the relief 4;
a means 7 described below and for example forming part of a data sources assembly 8, whose purpose is to determine the effective values of a plurality of particular flight parameters, also described below;
a central unit 9 which is connected by the intermediary of links 11 and 12 respectively to said means 5 and 7, and whose purpose is to calculate an avoidance path from said effective values of particular flight parameters determined by said means 7, to project this avoidance path in front of the aircraft A, and to check if said avoidance path thus projected forwards is compatible with said terrain profile 6, at least over a predetermined distance (for example 10,000 meters) in front of the aircraft A; and
a means 13 which is connected by the intermediary of a link 14 to said central unit 9, for transmitting a warning signal (sound and/or visual) in the case of detection of a collision risk by said central unit 9.

According to the invention, said central unit 9 comprises:
a unit 15 for calculating, using effective values (determined by said means 7) of certain of said particular flight parameters, as described below, a height variation ΔH of the aircraft A which is due to a transfer of energy and to a variation of total slope generated by a speed reduction, during an avoidance maneuver implemented in order to avoid a terrain 2 in front of the aircraft A; and a unit 16 which is connected by a link 17 to said unit 15 for using the height variation ΔH calculated by the latter, for the purpose of determining an avoidance path that is the best possible representation of reality; and a unit 3 which is connected by a link 10 to said unit 16 for using the avoidance path determined by the latter, for the purpose of checking if said avoidance path is compatible with said terrain profile 6, over said predetermined distance in front of the aircraft A.

Figure 3:
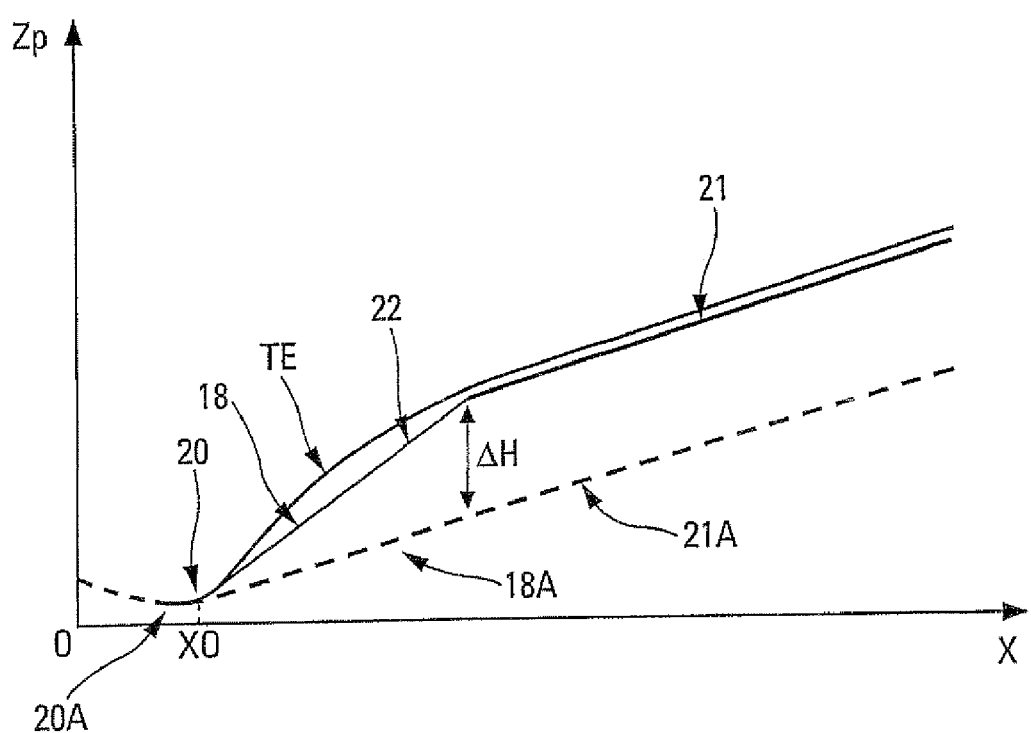
FIG. 3 is a graph making it possible to illustrate essential features of the present invention.

In order to do this, said unit 3 uses an assistance curve 18 (or avoidance curve) which is calculated by the unit 16, which is shown in FIG. 3 and which is considered to reproduce an avoidance maneuver. Said unit 3 makes this assistance curve 18 move rectilinearly in front of the aircraft A and it checks that it does not encounter the terrain profile 6 in front of the current position of the aircraft A, at least over said predetermined distance. Thus, as long as the moved assistance curve 18 thus moved does not encounter the terrain profile 6, the aircraft A is able to fly over the relief 4 of the terrain 2 which is in front of it.

However, when during the movement of the assistance curve 18, said assistance curve 18 encounters the terrain profile 6, there is a risk of collision with the latter such that the unit 3 then orders the means 13 to transmit a warning signal, as illustrated by a symbol 19 in FIG. 2. At that time, the pilot or an automatic guidance system makes the aircraft A follow an avoidance path TE intended to allow said aircraft A to fly over the relief 4 of the terrain 2 which is in front of it and thus to avoid a collision.

Up until the present, a usual assistance curve 18A (intended to reproduce an avoidance maneuver) comprised, as shown in dotted line in FIG. 3:
 a first part 20A (or pull-out part) representative of a pull-out phase of the avoidance maneuver and intended to allow the aircraft A to regain altitude. This pull-out part 20A was usually constructed by taking into account a constant load factor of the aircraft A in such a way as to correspond to an arc of circle of constant radius; and
 a constant slope part 21A, which follows this pull-out part 20A tangentially.

Such a usual assistance curve 18A does not exactly reproduce the avoidance maneuver actually carried out by the aircraft A if necessary, which can in particular give rise to false alarms (relating to a collision risk).

The assistance curve 18 according to the invention makes it possible to overcome this disadvantage by reproducing in an optimized manner the avoidance maneuver actually carried out by the aircraft A. For this purpose, according to the invention, said assistance curve 18 comprises, in addition to a special pull-out part 20 described below and a usual constant slope part 21, an intermediate part 22 taking said height variation ΔH into account. This assistance curve 18 therefore takes account of a dynamic increase in the altitude, starting from the end of said pull-out part 20 and doing this up until the start of said constant slope part 21 (which is therefore vertically shifted upwards by said height variation ΔH, with respect to said usual part 21A).

In order to do this, said means 7 comprises units not shown specifically in order, respectively:
 to estimate the effective mass GW of the aircraft A;
 to measure the current effective speed VO of the aircraft A; and
 to measure the current effective slope γO (with respect to the ground) of the aircraft A.

Moreover, in a first embodiment, for which said total slope variation corresponds to a thrust variation, said unit 15 determines the height variation ΔH, using the preceding effective values and the following expressions:

$$\Delta H = [K1 \cdot (VO^2 - VF^2)/2 \cdot g + (K2 \cdot (VO - VF) + K3)/(GW - GWO)] \cdot f(x)$$

$$f(x) = f(X - XO; VF; GW; \gamma F - \gamma O) = X - XO/[K4 \cdot GW \cdot VF \cdot (\gamma F - K5 \cdot \gamma O)]$$

$$f(x) \in [O; 1]$$

in which:
K1, K2, K3, K4 and K5 are predetermined parameters depending on the aircraft A;
g represents the acceleration of gravity;
GWO represents a predetermined constant value of the mass of the aircraft A, dependent on said aircraft A;
VF represents a constant value of the speed corresponding to the stabilized speed reached at the end of the avoidance maneuver, this value being predetermined and dependent on said aircraft A;
γF represents a constant value of the flight slope corresponding to the flight slope with respect to the ground, stabilized at the end of the avoidance maneuver, this value being predetermined and dependent on the aircraft A and on status parameters;
X represents the current position of the aircraft A on a horizontal axis OX of a vertical plane of symmetry OXZp of the aircraft A; and
XO represents the position of the aircraft A, on said horizontal axis OX of said vertical plane OXZp, at the start of a height variation phase of said avoidance maneuver, as shown in FIG. 3.

This height variation ΔH is due, as mentioned previously, to an energy transfer (giving rise to a height variation ΔH1) and to a thrust variation (giving rise to a height variation ΔH2):

$$\Delta H = \Delta H1 + \Delta H2.$$

The height variation ΔH1 illustrates a conversion of kinetic energy into potential energy:

$$\Delta H1 = K1 \cdot (VO^2 - VF^2)/2 \cdot g.$$

Moreover, in this first embodiment, the height variation ΔH2 is due to a thrust variation, which is generated by a speed reduction.

Moreover, in a second embodiment, for which the height variation ΔN is due to an energy transfer and to a total slope variation generated by a speed reduction, said height variation ΔH is a function of the geometric slope γ:

$$\Delta H \approx \int \gamma \cdot dx$$

This geometric slope is however equal to the sum of the total slope γTOT and of an acceleration term:

$$\gamma = \gamma TOT - (dVSOL/dt)/g$$

The total slope is equal to the propulsive balance, that is to say to the difference between the thrust and the drag over the mass:

$$\gamma TOT \approx (P - T)/m \cdot g$$

This total slope γTOT contributes to a height increase ΔH, because it increases as the speed reduces. This increase in total slope, which is inversely proportional to the speed, is due to the increase in thrust inversely proportional to the speed.

In fact, this physical phenomenon is particularly accentuated in a turboprop where the preponderant term for the thrust is expressed by:

$$P \approx \text{Useful power}/V$$

The height variation ΔH can therefore be calculated by the unit 15, in this second embodiment, step by step, as the sum of two contributions:

ΔH3, which is the conversion of kinetic energy into potential energy caused by the decelerations; and ΔH4, which represents the total slope of the step in question, that is to say:

$$\Delta H = \Delta H3 + \Delta H4$$

with, for a step i $$\Delta H3 = (V_{i+1}^2 - V_i^2)/2 \cdot g$$

$$\Delta H4 = tg(\gamma TOT) \cdot \Delta xi$$

Moreover, according to the invention, said central unit 9 furthermore comprises:

a unit 23 for calculating, using the effective values of the mass GW and of the speed VO of the aircraft A (determined by said means 7), a load factor Nz which is representative of the real load factor of the aircraft A, during the pull-out phase of an avoidance maneuver really carried out by the aircraft A; and an additional unit, for example the unit 16 which is connected by a link 24 to said unit 23, for using said load factor Nz (instead of a predetermined constant load factor, used up until the present) for the purpose of optimizing said pull-out part 20 of the assistance curve 18. This load factor Nz is taken into account for calculating, in the usual manner, the radius of the arc of circle forming this pull-out part 20.

In a particular embodiment, said unit 23 determines said load factor Nz, using the following expression:

$$Nz = n0 + (n1 \cdot GW) + (n2 \cdot VO)$$

in which n0, n1 and n2 are predetermined parameters.

This load factor Nz is closer to reality than is a constant load factor used in the prior art, which makes it possible to increase the conformity of the pull-out part 20 of the assistance curve 18.

The avoidance path TE actually followed by the aircraft A, in the case of detection of a collision risk by the device 1 and of initiation of an avoidance maneuver, is thus reproduced faithfully by the assistance curve 18 determined according to the present invention, as shown in FIG. 3.

Consequently, the detection of a risk of collision with the terrain 2 used by the device 1 takes account of an avoidance maneuver (in the form of the assistance curve 18) which is very close to an avoidance maneuver actually used if necessary by the aircraft A, which in particular makes it possible to avoid false alarms and thus to obtain a particularly reliable monitoring.

In a particular embodiment, at least some of said predetermined parameters n0, n1, n2, K1, K2 and K3 or of said constant values GWO, VF and γF (recorded in the central unit 9 or in the assembly 8 of data sources) depend on the effective flight configuration of the aircraft A. In this case, the assembly 8 of data sources comprise means intended for measuring parameters making it possible to determine the current flight configuration of the aircraft A, which depends for example on the flight phase, the aerodynamic configuration (slats, flaps) of the aircraft A, its altitude, etc.

The invention claimed is:

1. A method for automatically and repetitively detecting a risk of collision of an aircraft with surrounding terrain, comprising:
   a) taking into account a profile of terrain located in front of the aircraft;
   b) determining effective values of particular flight parameters;
   c) determining, from the effective values, an avoidance path comprising at least a pull-out part and a constant slope part having a non-zero slope and projecting said determined avoidance path in front of the aircraft;
   d) checking if said determined avoidance path is compatible with said profile of the terrain at least over a predetermined distance in front of the aircraft; and
   e) if an incompatibility is detected in step d), transmitting a corresponding warning signal, wherein:

step c) comprises:
   calculating, using the effective values of at least one of said particular flight parameters, a height variation of the aircraft which is due to a transfer of energy and a total slope variation generated by a speed reduction during an avoidance maneuver, said height variation indicating a height difference between an initial avoidance path and said determined avoidance path; and
   determining the determined avoidance path, using the height variation, which substantially follows the initial actual avoidance path and which comprises, between the pull-out part and the constant slope part, an intermediate part which takes account of the height variation such that the determined avoidance path accounts for a dynamic increase in the altitude from the end of the pull-out part to a beginning of the constant slope part, which is vertically shifted upwards by the height variation; and step d) comprises:
   checking whether the determined avoidance path is compatible with said profile of the terrain over said predetermined distance in front of the aircraft.

2. The method as claimed in claim 1, wherein said total slope variation generated by the speed reduction corresponds to a thrust variation.

3. The method as claimed in claim 2, wherein:
   step b) comprises:
   estimating an effective mass of the aircraft;
   measuring a current effective speed of the aircraft; and
   measuring a current effective slope of the aircraft; and
   step c) further comprises:
   calculating said height variation, using the following equations:

$$\Delta H = f(x)[K1(VO^2 - VF^2)/2g + K2(VO - VF) + K3/GW - GWO]$$

$$f(x) = f(X - XO; VF; GW; \gamma F - vO)$$

$$f(x) \in [0;1]$$

in which:
   K1, K2 and K3 are predetermined parameters depending on the aircraft;
   g represents an acceleration of gravity;
   GWO represents a predetermined constant value of a mass of the aircraft, dependent on said aircraft;
   VF represents a constant value of a speed corresponding to a stabilized speed reached at an end of the avoidance maneuver, the value being predetermined and dependent on the aircraft;

γF represents a constant value of the flight slope corresponding to the flight slope with respect to the ground, stabilized at the end of the avoidance maneuver, the value being predetermined and dependent on the aircraft and on status parameters;

X represents a current position of the aircraft on a horizontal axis of a vertical plane of symmetry of the aircraft; and XO represents a position of the aircraft, on said horizontal axis of said vertical plane, at a start of a height variation phase of said avoidance maneuver.

4. The method as claimed in claim 1, wherein, in step c), said height variation is calculated, step by step, by producing the sum of:
a first height variation which represents a conversion of kinetic energy into potential energy provoked by deceleration of the aircraft; and
a second height variation which represents the total slope of the step being calculated.

5. The method as claimed in claim 1, wherein:
step c) further comprises:
calculating, using the determined effective values of at least one of said particular flight parameters, a load factor which is representative of a pull-out phase of the avoidance maneuver; and
determining, using the load factor, the pull-out part of the determined avoidance path, which substantially follows an initial pull-out part of the initial avoidance path; and
step d) further comprises:
checking, using the pull-out part, if the determined avoidance path is compatible with said profile of the terrain, over said predetermined distance in front of the aircraft.

6. The method as claimed in claim 5, wherein:
step b) comprises:
estimating an effective mass of the aircraft; and
measuring a current effective speed of the aircraft; and
step c) further comprises:
calculating said load factor using the following expression:

$$Nz = n0 + (n1 \times GW) + (n2 \times VO)$$

in which n0, n1 and n2 are predetermined parameters.

7. The method as claimed in claim 3, wherein at least one of said predetermined parameters and said constant values depend on an effective flight configuration of the aircraft.

8. A device for detecting a risk of collision of an aircraft with the surrounding terrain, comprising:
a profile unit storing a profile of terrain located in front of the aircraft;
a determination unit for determining effective values of particular flight parameters;
a central unit for calculating, from said effective values, an avoidance path comprising at least a pull-out part and a constant slope part having a non-zero slope, and for checking if said calculated avoidance path is compatible with said profile of the terrain, at least over a predetermined distance in front of the aircraft; and
a transmitting unit for transmitting a corresponding warning signal, if said central unit detects an incompatibility, wherein said central unit comprises at least:
a calculating unit for calculating, using the determined effective values of at least one of said particular flight parameters, a height variation of the aircraft which is due to a transfer of energy and to a variation in total slope generated by a speed reduction, during an avoidance maneuver, said height variation indicating a height difference between an initial avoidance path and said calculated avoidance path;

an avoidance path calculation unit for using the height variation calculated by said calculating unit in order to determine the calculated avoidance path that substantially follows the initial avoidance path, such that the calculated avoidance path accounts for a dynamic increase in the altitude from the end of the pull-out part to a beginning of the constant slope part, which is vertically shifted upwards by an amount of the height variation; and a checking unit for using the calculated avoidance path determined by said avoidance path calculation unit in order to check if the calculated avoidance path is compatible with said profile of the terrain, over said predetermined distance in front of the aircraft.

9. The device as claimed in claim 8, wherein said central unit further comprises:
a load factor calculating unit for calculating, using the determined effective values of at least one of said particular flight parameters, a load factor which is representative of a pull-out phase of the avoidance maneuver;
the avoidance path calculation unit uses the load factor, calculated by said load factor calculating unit, in order to determine the pull-out part of the calculated avoidance path, which substantially follows an actual pull-out part of the initial avoidance path; and
the checking unit uses the pull-out part, determined by said avoidance path calculation unit, in order to check if said calculated avoidance path is compatible with said profile of the terrain, over said predetermined distance in front of the aircraft.

10. An aircraft, comprising a device for automatically and repetitively detecting a risk of collision of an aircraft with surrounding terrain by:
a) taking into account a profile of terrain located in front of the aircraft;
b) determining effective values of particular flight parameters;
c) determining, from the effective values, an avoidance path comprising at least a pull-out part and a constant slope part having a non-zero slope and projecting said determined avoidance path in front of the aircraft;
d) checking if said determined avoidance path is compatible with said profile of the terrain, at least over a predetermined distance in front of the aircraft; and
e) if an incompatibility is detected in d), transmitting a corresponding warning signal, wherein:
c) comprises: calculating, using the effective values of at least one of said particular flight parameters, a height variation of the aircraft which is due to a transfer of energy and a total slope variation generated by a speed reduction during an avoidance maneuver, said height variation indicating a height difference between an initial avoidance path and said determined avoidance path; and
determining the determined avoidance path, using the height variation, which substantially follows the initial avoidance path and which comprises, between the pull-out part and the constant slope part, an intermediate part which takes account of the height variation; and
d) comprises: checking whether the determined avoidance path is compatible with said profile of the terrain over said predetermined distance in front of the aircraft.

11. An aircraft, comprising a device as claimed in claim 8.

12. A method for automatically and repetitively detecting a risk of collision of an aircraft with surrounding terrain, comprising:

a) taking into account a profile of terrain located in front of the aircraft;
b) determining effective values of particular flight parameters;
c) determining, from the effective values, an avoidance path comprising at least a pull-out part and a constant slope part having a non-zero slope and projecting said determined avoidance path in front of the aircraft;
d) checking if said determined avoidance path is compatible with said profile of the terrain at least over a predetermined distance in front of the aircraft; and
e) if an incompatibility is detected in step d), transmitting a corresponding warning signal, wherein:
step c) comprises:
calculating, using the effective values of at least one of said particular flight parameters, a height variation of the aircraft which is due to a transfer of energy and a total slope variation generated by a speed reduction during an avoidance maneuver, said height variation indicating a height difference between an initial avoidance path and said determined avoidance path; and
determining the determined avoidance path, using the height variation, which substantially follows the initial avoidance path and which comprises, between the pull-out part and the constant slope part, an intermediate part which takes account of the height variation such that the determined avoidance path accounts for a dynamic increase in the altitude from the end of the pull-out part to a beginning of the constant slope part, which is vertically shifted upwards by an amount of the height variation; and
step d) comprises:
checking whether the determined avoidance path is compatible with said profile of the terrain over said predetermined distance in front of the aircraft, wherein said total slope variation generated by the speed reduction corresponds to a thrust variation, and
step b) comprises:
estimating an effective mass of the aircraft;
measuring a current effective speed of the aircraft; and
measuring a current effective slope of the aircraft; and
step c) comprises:
calculating said height variation, using the following equations:

$$\Delta H = f(x)[K1(VO^2 - VF^2)/2g + K2(VO - VF) + K3/GW - GWO]$$

$$f(x) = f(X - XO; VF; GW; \gamma F - vO)$$

$$f(x) \in [0;1]$$

in which:
K1, K2 and K3 are predetermined parameters depending on the aircraft;
g represents an acceleration of gravity;
GWO represents a predetermined constant value of a mass of the aircraft, dependent on said aircraft;
VF represents a constant value of a speed corresponding to a stabilized speed reached at an end of the avoidance maneuver, the value being predetermined and dependent on the aircraft;
$\gamma F$ represents a constant value of the flight slope corresponding to the flight slope with respect to the ground, stabilized at the end of the avoidance maneuver, the value being predetermined and dependent on the aircraft and on status parameters;
X represents a current position of the aircraft on a horizontal axis of a vertical plane of symmetry of the aircraft; and
XO represents a position of the aircraft, on said horizontal axis of said vertical plane, at a start of a height variation phase of said avoidance maneuver.

* * * * *